US006819100B2

(12) United States Patent
Iida et al.

(10) Patent No.: US 6,819,100 B2
(45) Date of Patent: Nov. 16, 2004

(54) METHOD OF CREATING CONVERSION TABLE FOR DISTANCE DETECTION AND DISPLACEMENT SENSOR

(75) Inventors: Yusuke Iida, Ayabe (JP); Hidetomo Ohtsuki, Fukuchiyama (JP); Toru Hosoda, Ayabe (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 10/734,576

(22) Filed: Dec. 15, 2003

(65) Prior Publication Data

US 2004/0174158 A1 Sep. 9, 2004

(30) Foreign Application Priority Data

Dec. 19, 2002 (JP) ........................................ 2002-368832

(51) Int. Cl.⁷ ................................................. G01B 7/14

(52) U.S. Cl. ............................... 324/207.12; 324/207.23

(58) Field of Search ..................... 324/207.11, 207.12, 324/207.15–207.19, 207.2, 207.21–207.26, 236, 239, 257, 258, 326–327; 340/561

(56) References Cited

U.S. PATENT DOCUMENTS 5,410,488 A * 4/1995 Andersen, III .............. 702/158
5,986,549 A * 11/1999 Teodorescu ................. 340/561

FOREIGN PATENT DOCUMENTS

JP        7131321 A    5/1995
JP     2001165603 A    6/2001

* cited by examiner

Primary Examiner—Bot LeDynh
(74) Attorney, Agent, or Firm—Foley & Lardner LLP

(57) ABSTRACT

A source table showing a standard relation between a detection object and a detection distance is stored in a memory (4). A CPU (3) receives inputs regarding distances to three measurement points from an input portion (5) and recognizes an amplitude voltage corresponding to the input, as a measured value at the measurement point. Furthermore, the CPU (3) extracts a range which corresponds to a difference between the farthest distance and the shortest distance, in which a ratio between voltages corresponding to measurement points closely resembles a ratio between the actually measured values, from the source table as a usage range, and creates a conversion table by correcting voltages in this extracted range.

4 Claims, 7 Drawing Sheets

METHOD OF CREATING CONVERSION TABLE FOR DISTANCE DETECTION AND DISPLACEMENT SENSOR

BACKGROUND OF THE INVENTION

1. Field of the Invention

The present invention relates to a displacement sensor which comprises a detector in which an AC magnetic field for detecting an object is generated by an oscillation circuit and detects a distance to a detection object, using a change in oscillation state of the oscillation circuit. More particularly, the present invention relates to technique for creating a conversion table for finding a detection distance from an oscillation state of an oscillation circuit in this kind of sensor (referred to as a displacement sensor or simply a sensor, hereinafter).

2. Description of the Prior Art

According to a proximity-type of displacement sensor intended for a metal body, in general, a high-frequency magnetic field from a detection coil acts on a detection object so that a distance to the detection object is detected (this detected distance is referred to as a detection distance, hereinafter), using a phenomenon in which an oscillation amplitude of the oscillation circuit changes according to a change in inductance due to the act of an eddy current magnetic field from the detection object.

The conventional displacement sensor incorporates a memory in which a conversion table showing the relation between the oscillation amplitude of the oscillation circuit and the detection distance is stored, and a controller such as a microcomputer. The controller finds the distance to the detection object by referring the conversion table to the measured value of the oscillation circuit and outputs it as a voltage signal proportional to the distance.

In the memory of the conventional displacement sensor, a table showing a standard relation between an oscillation amplitude and a detection distance is set every kind of the detection object (this table is referred to as a source table and a curving line of the source table is referred to as a standard curving line, hereinafter. Since the oscillation amplitude is detected as a voltage, it is referred to as an amplitude voltage or simply a voltage as needed.). However, since the relation between the amplitude voltage and the detection distance varies depending on a size of the detection object or variation of the detection coil, when it is necessary to perform high-precision measurement processing, the source table is corrected by teaching assisted by an actual detection object and creates the conversion table according to an installation condition.

Publicly known technique for creating the conversion table is disclosed in the following patent document 1. According to this patent document 1, sensor heads comprising coils are arranged at a point abutting on a detection object (a distance at this point is referred to as the minimum distance hereinafter), a point provided at the farthest distance as far as the detection object can be detected (distance at this point is referred to as the maximum distance, hereinafter), and a middle point between them, and measure amplitude voltages at the points. In addition, apart from these measurement, a voltage in a state which is not affected by the detection object (referred to as an open-state voltage in the patent document 1) is measured and the actually measured values at the three points are normalized by the open-state voltage. Then, the standard curving line corresponding to a range from the minimum distance to the maximum distance is corrected so that the voltages corresponding to the three points may be equal to the normalized actually measured values and its corrected result is stored in the memory as the conversion table.

Patent document 1 is Japanese Unexamined Patent Publication No. 2001-165603.

According to the method of the patent document 1, since each actually measured value is normalized by an open-state voltage so that an influence due to characteristics of the sensor head can be removed from each actually measured value, the high-precision conversion table can be created.

In addition, according to patent document 2 also, voltages are measured at three measurement points such as points corresponding to the minimum distance and the maximum distance and a middle point between them, and a correction value for correcting the amplitude voltage linearly is found, using these actually measured values. According to this document, the voltage at the measurement points of the minimum distance and the maximum distance are measured and shift correction and rotation correction are carried out so that these voltages may reach respective predetermined values. Then, the voltage at the middle point is measured and the shift correction and after the rotation correction are performed on the actually measured value, a correction value which is most suitable for the actually measured values at three points after the correction is called from a storage circuit and set.

Patent document 2 is Japanese Unexamined Patent Publication No. 7-131321.

According to the both patent documents 1 and 2, the voltages are measured while the detection object or the sensor head is moved so that the sensor head may be positioned at three points which were determined for the detection object.

According to this kind of sensor, since the oscillation state could be varied due to an influence of peripheral metal or an electromagnetic wave, it is preferable that the sensor is actually positioned in a usage environment and then the conversion table is created, in order to perform the high-precision measurement processing. However, when the measurement points are fixed like in the patent documents 1 and 2, the measurement at the position corresponding to the measurement point is sometimes difficult (for example, some kind of member is disposed at the position corresponding to the measurement point). In addition, when the open-state voltage is measured like in the patent document 1, it is preferable that the measurement is performed under a condition which is unaffected by the peripheral metal. However, it is considerably difficult to perform such measurement at a place where the sensor is installed.

Thus, when the measurement cannot be performed at the measurement point in the place where the sensor is installed, or in order to precisely measure the open-sate voltage, it is necessary to perform the measurement at another place before the sensor is installed or after the sensor is removed. Therefore, it is difficult to secure precision of the conversion table.

Furthermore, according to the method of the patent document 2, since the shift correction amount and the rotation correction amount are found by measuring the voltages at the measurement points of the minimum distance and the maximum distance and then the voltage is measured at the middle point is performed, the order of the measurement is fixed so that operationality is lowered.

SUMMARY OF THE INVENTION

The present invention was made in view of the above problems and it is an object of the present invention to be able to create a conversion table using measured values at any measurement points arbitrarily decided by a user under a condition where a sensor is installed in an actual usage environment, and to be able to create a conversion table suitable for an actual usage environment or usage condition.

A method according to the present invention is a method of creating a conversion table used in process for converting an oscillation state of an oscillation circuit, to a distance to a detection object, in a displacement sensor including a detector in which the oscillation circuit generates an AC magnetic field for detecting the object. The method of creating the conversion table according to the present invention comprises a step of arranging the detection object at each measurement point of any three measurement points whose distance from the displacement sensor is known, in any order and measuring the oscillation state of the oscillation circuit at the measurement point; a step of extracting a range which corresponds to a distance between the nearest measurement point and the farthest measurement point from the detector, in which a ratio between measured values corresponding to measurement points closely resemble a ratio between the actually measured values, from a source table showing a standard relation between the measured value of the oscillation circuit and a distance to the detection object; a step of correcting a measured value included in the range extracted from the source table so that the measured value corresponding to the measurement point may be matched to the actually measured value; and a step of setting a table showing a relation between the measured value after-corrected and the distance as the conversion table.

The above method can be applied to a type of proximity switch having a detector including a detection coil and an oscillation circuit generating a high-frequency magnetic field in this detection coil and being intended for detection of a metal body. In addition, this method can be applied to a capacitance type displacement sensor which has a detector including an electrode and an oscillation circuit and detects a distance from a change in oscillation state according to a change in capacitance of the electrode and a detection object. In addition, the capacitance type displacement sensor can be intended for detection of both metal and nonmetal bodies.

According to the above method, although the oscillation state of the oscillation circuit is the amplitude voltage in general, an oscillation frequency or a phase of the oscillation circuit can be used, for example. In addition, although the distance to each measurement point is preferably a distance from the detection coil or the electrode, this may be a distance from a detection surface (front end surface) of the sensor instead of the above.

The source table can be obtained by measuring the oscillation state by the standard detector while moving a model of the detection object of a predetermined standard by a constant distance, and relating the obtained measured value to the distance. Furthermore, although it is preferable that this source table has been already stored in the memory in the displacement sensor, the sensor may be connected to an external device such as a personal computer and data of the source table may be sent from the external device to the sensor when the conversion table is created, for example.

The step of extraction processing from the source table is based on an idea that variation is generated in the detection distance because of variation due to characteristics of the detection object and the sensor or an influence of a peripheral environment even in the same standard sensor. For example, it can be thought that an oscillation state obtained at a point whose distance from the sensor is known in a sensor A is equivalent to that obtained at a position shifted from the measurement point of the sensor A by a predetermined distance L in another sensor B.

Therefore, it can be thought that the standard curving line of the source table is shifted from the actual measurement point by the variation corresponding to the characteristics of the detection object and the sensor, at the points corresponding to the three measurement points.

Here, when it is assumed that the actually measured values obtained at the three measurement points are Vnear, Vmid and Vfar in increasing order of distance from the displacement sensor and measured values corresponding to the actually measured values Vnear, Vmid and Vfar are Tnear, Tmid and Tfar, respectively on the source table, even if there is a shift in the distance, it can be thought that the distance between the actual measurement points is almost the same as the distance between points corresponding to the measured values Tnear and Tfar. In addition, if it is assumed that the inclination of the standard curving line shown by the source table closely resembles a straight line, when a ratio $D_T$ between the measured values and a ratio $D_V$ between the actually measured values are found using the following equation (a) and (b), it is thought that $D_T$ takes a value closely resembling $D_V$.

$$D_T=(T\text{far}-T\text{near})/(T\text{mid}-T\text{near}) \quad \text{(a)}$$

$$D_V=(V\text{far}-V\text{near})/(V\text{mid}-V\text{near}) \quad \text{(b)}$$

Therefore, when a range corresponding to the distance between the shortest measurement point and the farthest measurement point from the sensor is extracted from the source table, for example, the start of the measured value in the extracted range corresponds to Vnear and the last of the measured value corresponds to Vfar and the measured value corresponding to the distance Vmid−Vnear from the start corresponds to Vmid. Thus, while an extracted position is changed, the measured value corresponding to each measurement point in the extracted range in each extracted position is found, and then it is determined whether the ratio $D_T$ between the measured values closely resembles the ratio $D_V$ between the actually measured values. Thus, the range showing a change which most closely resembles a signal change of the actually measured value can be extracted.

According to the step of correcting the measured value, the source table is corrected so that the measured values Tnear, Tmid and Tfar corresponding to the measurement points may be matched to the actually measured values Vnear, Vmid and Vfar, respectively in the range extracted from the source table as described above. In this correction, the offset correction is performed for each value in the extracted range so that the measured value Tnear corresponding to the nearest measurement point from the sensor may be matched to the actually measured value Vnear, for example, and then the inclination of the curving line shown by each value in the extracted range is corrected so that the correction value after offset of the measured value Tfar corresponding to the farthest measurement point from the sensor may be matched to the actually measured value Vfar, while Vnear is kept in the matched state.

In addition, in this step, it is preferable that correction is performed in order to correct an error between the measured value corresponding to each point existing between the nearest measurement point and the farthest measurement point, and the actually measured value. Furthermore, since the errors of ends (the measured values corresponding the nearest measurement point and the farthest measurement point) in the extracted range has been corrected in the two stages of corrections, by assuming that the error is increased as the distance from these ends is increased and the error is the maximum at the center position in the extracted range in the third correction, the correction amount to each measured value can be found.

In addition, although it is preferable that the measured values corresponding to the three measurement point coincide with the actually measured values, respectively at the final stage in the above corrections, a little error may be generated in the actually measured value. Still further, it is preferable that the range and each measured value extracted from the source table are normalized by the largest values Tfar and Vfar, respectively, in order to secure precision of the corrections, before the above corrections are performed.

According to the above method, since the range suitable for the characteristics of the detection object and the sensor for the processing is extracted from the source table based on the actually measured values obtained at the three measurement points, and the correction processing for correcting the error between each measured value in the extracted range and the actually measured value is performed, the correction value from which the variation due to the characteristics of the detection object and the sensor is removed can be obtained.

Meanwhile, since the three measurement points used in the above method can be set at any position, the measurement points can be selected so that a range (referred to as a detection range, hereinafter) to be actually detected by the sensor intended for the processing may be defined. In other words, the nearest point from the sensor, the farthest point from the sensor and any point between these points can be the measurement points in the detection range determined by the user. Thus, since the data required for detecting each distance included in the detection range is extracted from the source table and then the conversion table can be set by correcting the data so as to be suitable for the actually measured value of the sensor, the conversion table suitable for the detection range can be easily created. In addition, since the conversion table can be created after the sensor is installed in the usage environment, the variation due to the influence of the peripheral environment can be absorbed, so that high-precision conversion table suitable for the usage condition can be obtained.

In addition, according to this method, since the extraction processing from the source table and correction processing for the source table are performed after the measurement processing for the three measurement points is completed, the measurement processing for each measurement point can be performed in a random order. Still further, the measurement can be performed again at the measurement point which has been measured. In addition, the set positions of the measurement points can be changed and measurement can be performed again as needed.

Furthermore, a displacement sensor according to the present invention comprises a detection coil; an oscillation circuit for generating a high-frequency magnetic field in the detection coil; a controller for inputting a signal showing an oscillation state of the oscillation circuit and detecting a distance to a detection object; a memory for storing a conversion table for detecting the distance; and an operation portion for inputting data showing a distance to the detection object.

Meanwhile, this displacement sensor can separate the detection coil from another circuit as a sensor head, or a part of a circuit such as a resonance capacitor in an oscillation circuit may be included in a sensor head.

Furthermore, it is necessary to incorporate a detection circuit and an A/D conversion circuit in this displacement sensor in order to quantize and take out the oscillation state of the oscillation circuit. As the memory, it may be an internal memory in the control circuit or a memory for storing the conversion table may be separately incorporated. In addition, the source table can be previously stored in this memory.

The operation portion can be set so as to input degree data in which a predetermined distance is designated as one unit (10 mm is designated by 1 degree, for example) as well as to input a value itself showing the distance. Furthermore, this operation portion is not limited to the constitution in which the user directly input the numeral value, and may be constituted so as to display the numeral value to be input and receive a selection operation. Still further, although the operation portion may be provided on the surface of the sensor body, it may be a remote operation portion separated from the sensor body.

The controller comprises actually measured value recognizing means for inputting a signal showing an oscillation state of the oscillation circuit while corresponds to the data input from the operation portion and recognizing a value of the obtained signal as a measured value corresponding to the distance of the input data; extracting means for extracting a range which corresponds to a difference between the farthest distance and the shortest distance, in which a ratio between measured values corresponding to three measurement points closely resembles a ratio between the actually measured values, from a source table showing a standard relation between the measured value of the oscillation circuit and a distance to the detection object, based on a recognition result of the actually measured value recognizing means for any three distances; correcting means for correcting a measured value included in the range extracted by the extracting means so that the measured value corresponding to the distance may be matched to the actually measured value; and storing means for storing the relation between the measured value after corrected and distance in the memory as the conversion table.

The controller is preferably constituted by a computer in which a program for performing the processing of each means is incorporated. However, the present invention is not limited to this and each means or any one of means may be constituted by a component such as an ASIC (Application Specific Integrated Circuit).

The actually measured value recognizing means takes in the signal showing the oscillation state such as the amplitude voltage and the frequency just after the data is input from the operation portion, for example and then recognizes the value shown by the signal as the actually measured value corresponding to the distance shown by the input data. In addition, the signal is not always taken in after the data is input, and the data input may be received after the signal is taken in.

The three distances and actually measured values corresponding to the distances in the extracting means correspond to the above described distances and actually measured values corresponding to the three measurement points. The extracting means performs extraction processing so as to extract a range used in creating the conversion table, from the source table, based on these distances and actually measured values. In addition, after the correcting means performs the correction processing in the extracted range and then the table showing the relation between the measured value after corrected and the distance is set as the conversion table and stored in the memory by the storing means.

According to the above displacement sensor, the user can set the detection object at the nearest point from the sensor, the farthest point from the sensor and any point between these two points in the detection range set by the user and input data showing the distance between each point and the sensor after the sensor is installed. The controller inputs a signal showing the oscillation state of the oscillation circuit each time receives the input of the distances of the three points, and performs creation processing of the conversion table using the actually measured values recognized by this signal and the distances to automatically create the conversion table suitable for the characteristics of the detection object and the sensor and the usage condition. Thus, high-precision measurement processing can be performed by using this conversion table thereafter.

Furthermore, according to this conversion table, since the oscillation state is measured according to the input of the distance, and distance of each measurement point and the actually measured value can be related and recognized, the measuring order can be set at random and operationality at the time of setting processing can be improved.

In addition, the data input from the operation portion is not limited to the three measurement points and distances from four or more measurement points can be input. In this case, the control circuit can recognize a size of an extracted range in the source table, based on the difference between the farthest distance and the nearest distance and perform the extraction processing to the source table, using the actually measured value corresponding to these distances and three actually measured values corresponding to any other distances (meanwhile, the extract processing based on a ratio between four or more actually measured values can be performed). In addition, in the correct processing, further high-precision corrections can be performed using actually measured values other than the three actually measured values.

According to a displacement sensor of a still preferred embodiment, the operation portion is set so as to be able to perform a confirming operation, and the actually measured value recognizing means of the controller comprises modifying means for modifying the recognition result by receiving a retype for the already recognized actually measured value or a distance until the confirming operation is performed.

According to the above aspect, since the oscillation state can be measured again and data can be input many times as needed for each measurement point until the confirming operation is performed, even when the user fails to position the detection object or fails to input the data, modification processing for the failed measurement point can be easily performed and its convenience and operationality can be improved.

DESCRIPTION OF THE PREFERRED EMBODIMENTS

Figure 1:
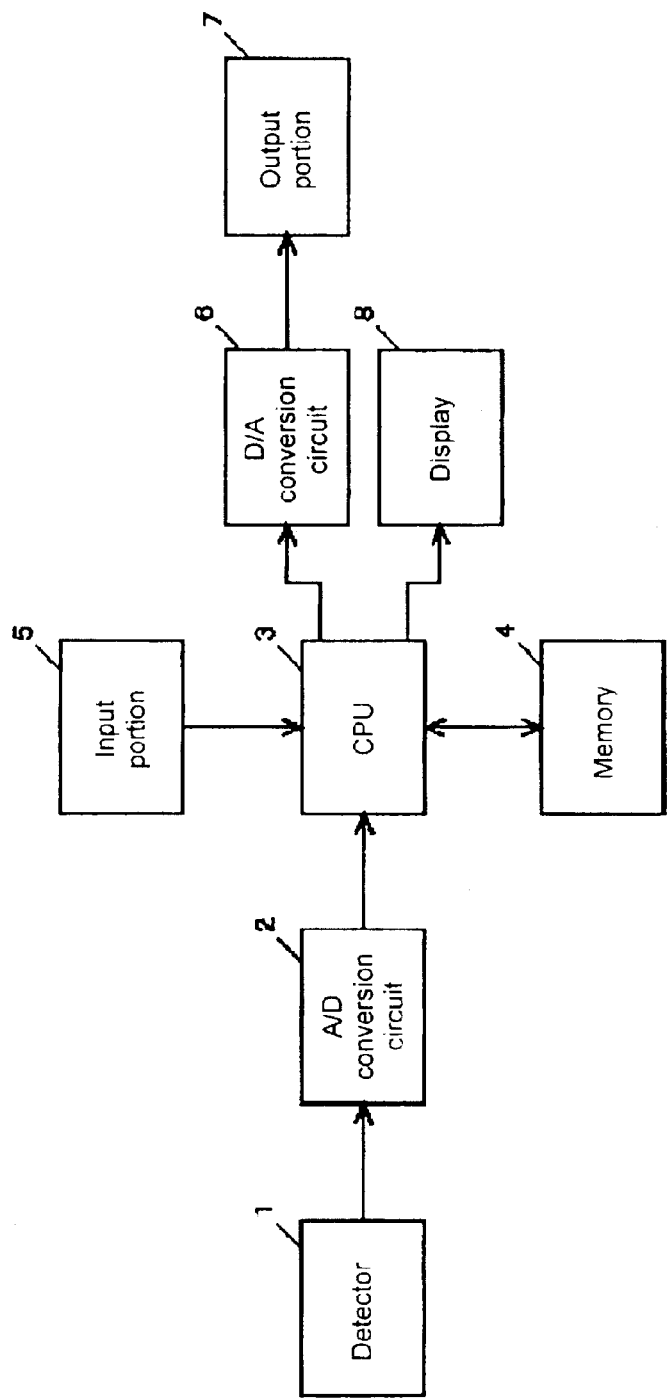
FIG. 1 shows a block diagram of an electric constitution of a displacement sensor according to the present invention.

FIG. 1 shows an electric constitution of a displacement sensor to which the present invention is applied.

The displacement sensor detects an object made of metal using a high-frequency magnetic field and measures a distance to the detection object, and it comprises a detector 1, an A/D conversion circuit 2, a CPU 3, a memory 4, an input portion 5, a D/A conversion circuit 6, an output portion 7, a display 8 and the like.

The detector 1 comprises a detection coil, an oscillation circuit for generating a high-frequency magnetic field in the detection coil, and a detection circuit for detecting an oscillation voltage of the oscillation circuit. The A/D conversion circuit 2 digitally converts the oscillation voltage detected by the detection circuit and outputs it to the CPU 3.

The memory 4 is a nonvolatile memory such as EEPROM. A source table showing a standard relation between an amplitude voltage and a detection distance as well as a program required for the processing of the CPU 3 and various kinds of set data are stored in the memory 4 of the sensor just after shipped from the manufacturer. In addition, the source table is not only one kind but a plurality of source tables can be provided corresponding to the kinds of the detection objects.

The input portion 5 comprises the predetermined number of operation keys provided on an upper surface of a case constituting a sensor body. The input portion 5 has functions of performing an operation for designating a start of creation processing of the conversion table, an operation for inputting a distance corresponding to each measurement point, and a completion operation of measurement processing.

The CPU 3 carries out various kinds of processing using the amplitude voltage output from the A/D conversion circuit 2. First, at the time of initial setting of the sensor, it takes in amplitude voltages at three measurement points to be described later and creates the conversion table suitable for an installation environment and a purpose of measurement, using the actually measured amplitude voltages and the source table. The created conversion table is stored in the memory 4.

When the creation of the conversion table is completed, the CPU 3 starts measurement processing. In this measurement processing, a distance to the detection object is found by referring the voltage output from the A/D conversion circuit 2 to the conversion table. This detection distance is displayed at the display 8 and also it is converted to an analog signal by the D/A conversion circuit 6 and output from the output portion 7 to an external device (not shown). In addition, the output portion 7 comprises an amplification circuit for amplifying the analog signal of the detection distance, an interface circuit for an external output and the like.

Figure 2:
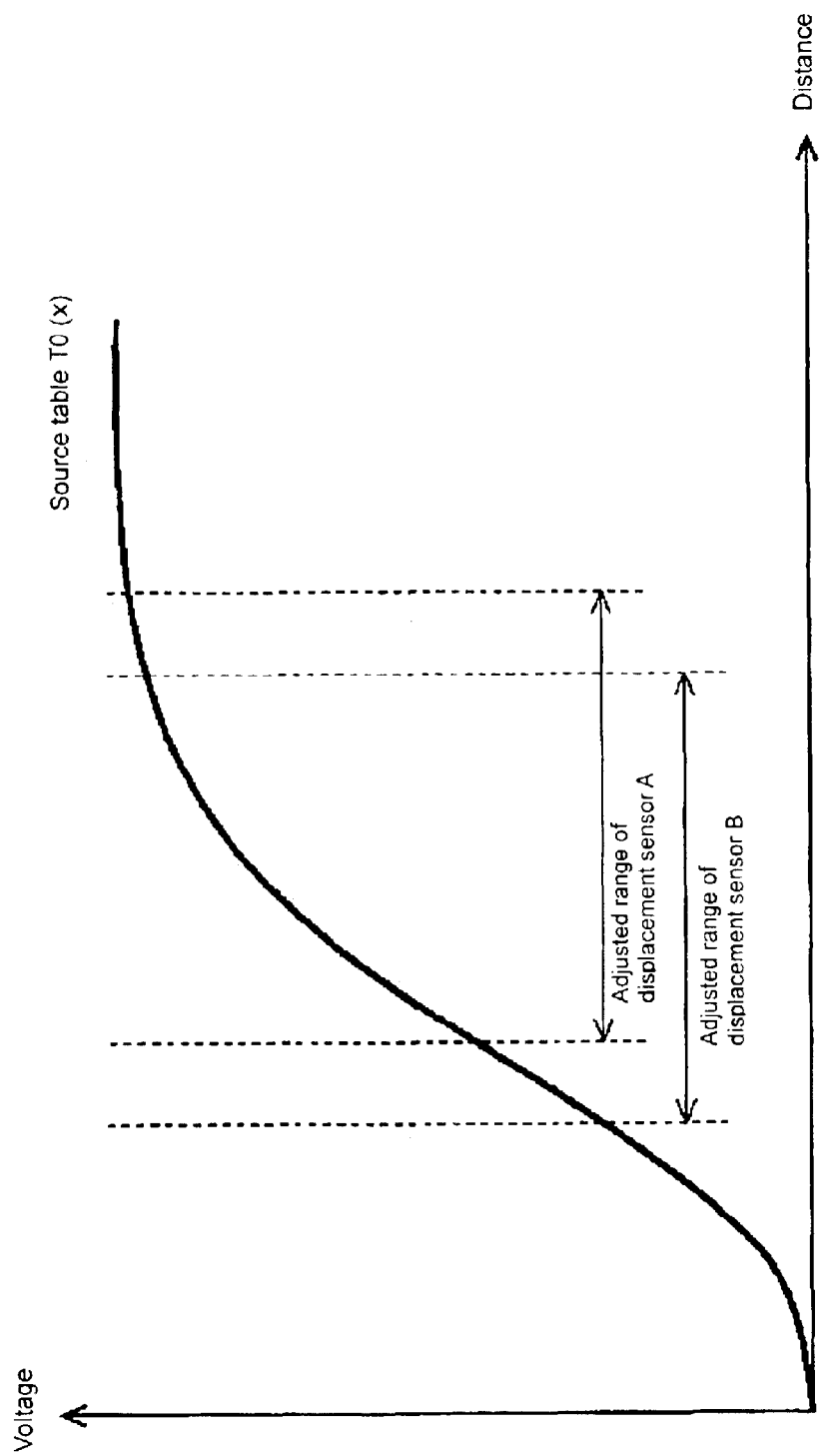
FIG. 2 shows a view of an example of a source table with variation in detection distance between used sensors.

FIG. 2 shows a standard curving line showing a concrete example of the source table. The standard curving line is obtained by measuring an amplitude voltage while varying the distance to the detection object at regular intervals, in a typical displacement sensor which is the same standard as that of the displacement sensor according to this embodiment, which shows a standard relation between a detection distance and an amplitude voltage within a rated distance range.

In addition, according to the source table of this embodiment, when it is assumed that the maximum detection distance according to the standard of this sensor is 100%, the amplitude voltage is shown each time the distance is varied by 1%. Although the contents of the source table is shown by the standard curving line in FIG. 2, the source table in the data is created as an arrangement T0 (x) of the voltage value corresponding to each distance x (a converted source table hereinafter is the same).

The detection distance in the displacement sensor used by an user is shifted from a distance axis shown by the source table because of a difference in size or configuration of the detection object, variation in characteristics of the detection coil and the like. Therefore, even when the same standard sensors A and B are installed under the same condition and the same detection range is set as that of the sensor used in creating the source table, the detection distances obtained by these sensors A and B in the source table are related to the respective different ranges as shown in FIG. 2. Therefore, it is necessary to create a conversion table in which the shift of the detection distance from the source table is corrected in each of the sensor A and B.

According to this embodiment, after the displacement sensor is installed in a usage environment, data corresponding to the detection range in which this sensor actually intends to perform processing, is extracted from the source table, this extracted data is processed and the conversion table suitable for the detection range is created.

Hereinafter, referring to FIGS. 3 to 6, the creation processing of the conversion table according to this embodiment is described in detail.

(1) Extraction of Usage Range for Source Table

According to this embodiment, the user arranges the detection object at three measurement points in total such as the nearest point from the sensor, the farthest point from the sensor and any point in the detection range in any order and inputs distances to the measurement points. The CPU 3 carries out the measurement processing of the amplitude voltage according to the input, extracts a range suitable for the actual detection range (referred to as a usage range, hereinafter) from the source table, based on an actually measured value of each voltage and the distance and carries out the following correction processing.

Figure 3:
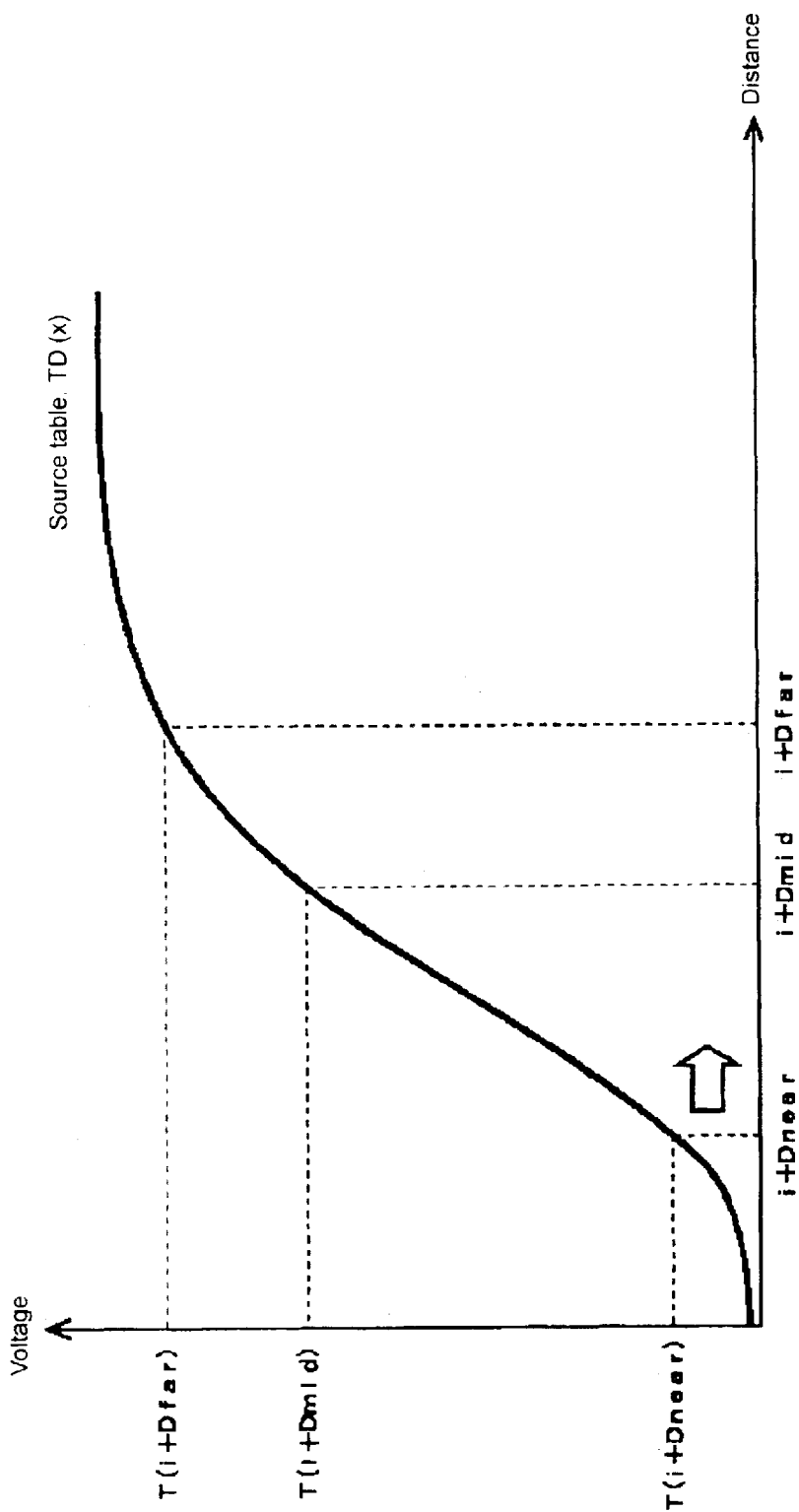
FIG. 3 shows a view of a concrete example of processing for extracting a range used in creating a conversion table from the source table.

FIG. 3 shows a concrete example of the extraction processing of the usage range from the source table. In the following drawings including FIG. 3 and description, the distances to the three measurement points are designated by Dnear, Dmid, and Dfar in increasing order of distance (according to need, Dnear is referred to as the shortest distance, Dmid is referred to as the middle distance and Dfar is referred to as the farthest distance, hereinafter). The actually measured values of the amplitude voltages at these distances Dnear, Dmid and Dfar are referred to as Vnear, Vmid and Vfar, respectively.

It is to be noticed that the shortest distance Dnear and the farthest distance Dfar are different from the minimum distance and the maximum distance in the patent documents 1 and 2, and they correspond to a front end and rear end positions in any detection range determined by the user.

In general, a part showing a great change in the standard curving line is determined as the usage range in order to secure detection precision in the displacement sensor, and the user sets the detection range in this range. Therefore, even when the distances Dnear, Dmid and Dfar to the measurement points are shifted from the corresponding points on the distance axis of the source table by predetermined amounts, these points are thought to be almost included in the range in which the great change occurs. Thus, when it is assumed that inclination of the standard curving line corresponding to this great change closely resembles a straight line, it can be thought that a ratio between measured values corresponding to Dnear, Dmid and Dfar is almost the same as that between the actually measured values Vnear, Vmid and Vfar.

Then, according to this embodiment, a range which is a length range corresponding to the detection range (a range having a width corresponding to (Dfar−Dnear)) in which a ratio between voltages corresponding to measurement points closely resembles a ratio between the actually measured values Vnear, Vmid and Vfar is extracted as the usage range from the source table. More specifically, a point in which k(i) becomes the minimum is detected while a value of i in the following equation (1) is moved one by one in a predetermined range including 0.

$$k(i) = \left| \frac{(Vfar - Vnear)}{(Vmid - Vnear)} - \frac{(T0(i + Dfar) - T0(i + Dnear))}{(T0(i + Dmid) - T0(i + Dnear))} \right| \quad (1)$$

Thus, it follows that the value of i when k(i) becomes the minimum in the above equation (1) corresponds to a shifted amount of the detection distance in this sensor. Therefore, when the value of i when k(i) becomes minimum in the equation (1) is determined, the distance on the side of the source table is corrected by the value of i (more specifically, each distance x is updated to a value in which i is subtracted from the present value). Thus, the distance axis in FIG. 3 becomes suitable for the sensor to perform processing and the range from Dnear to Dfar can be extracted as the usage range.

Figure 4:
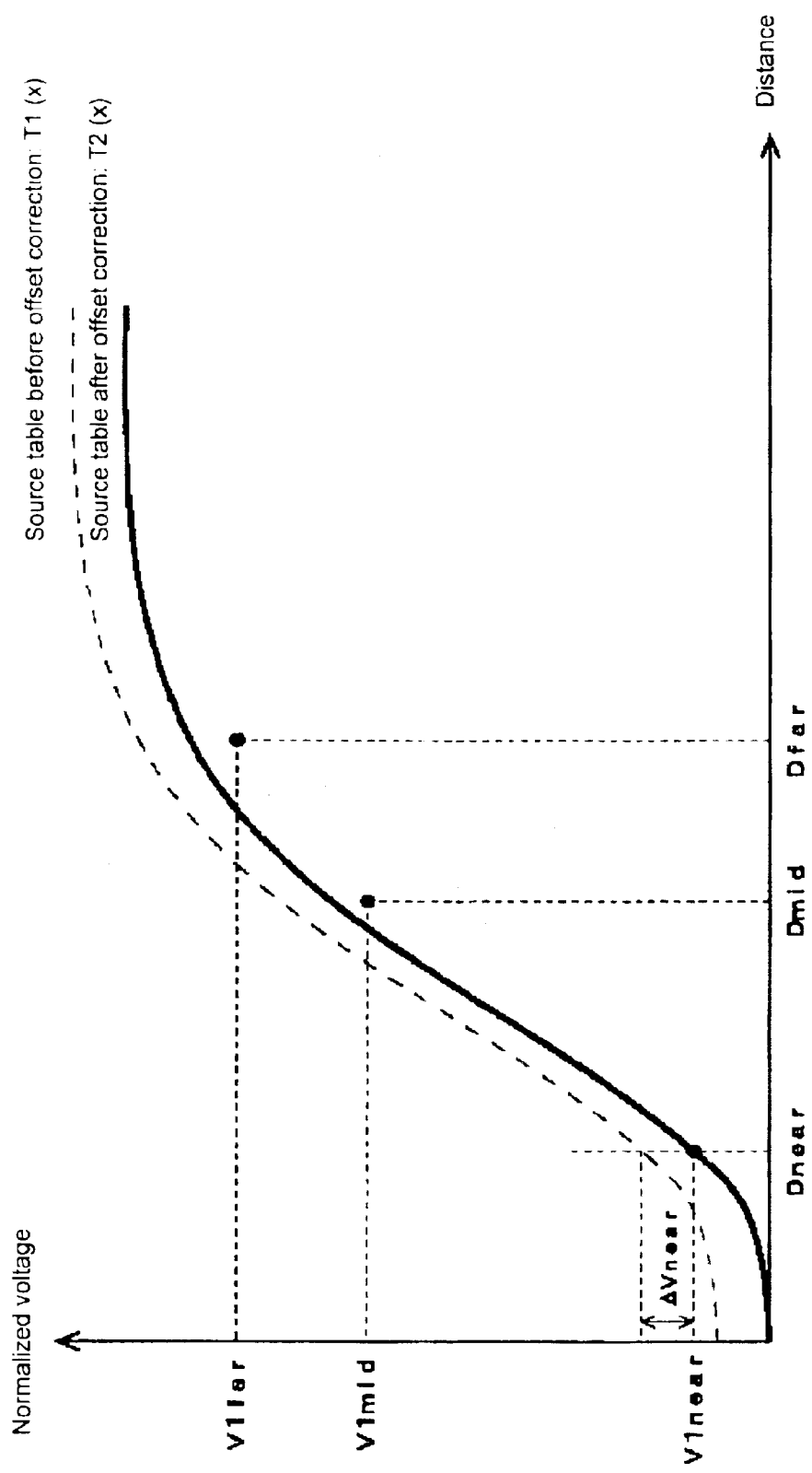
FIG. 4 shows a view of a concrete example of offset correction.
Figure 5:
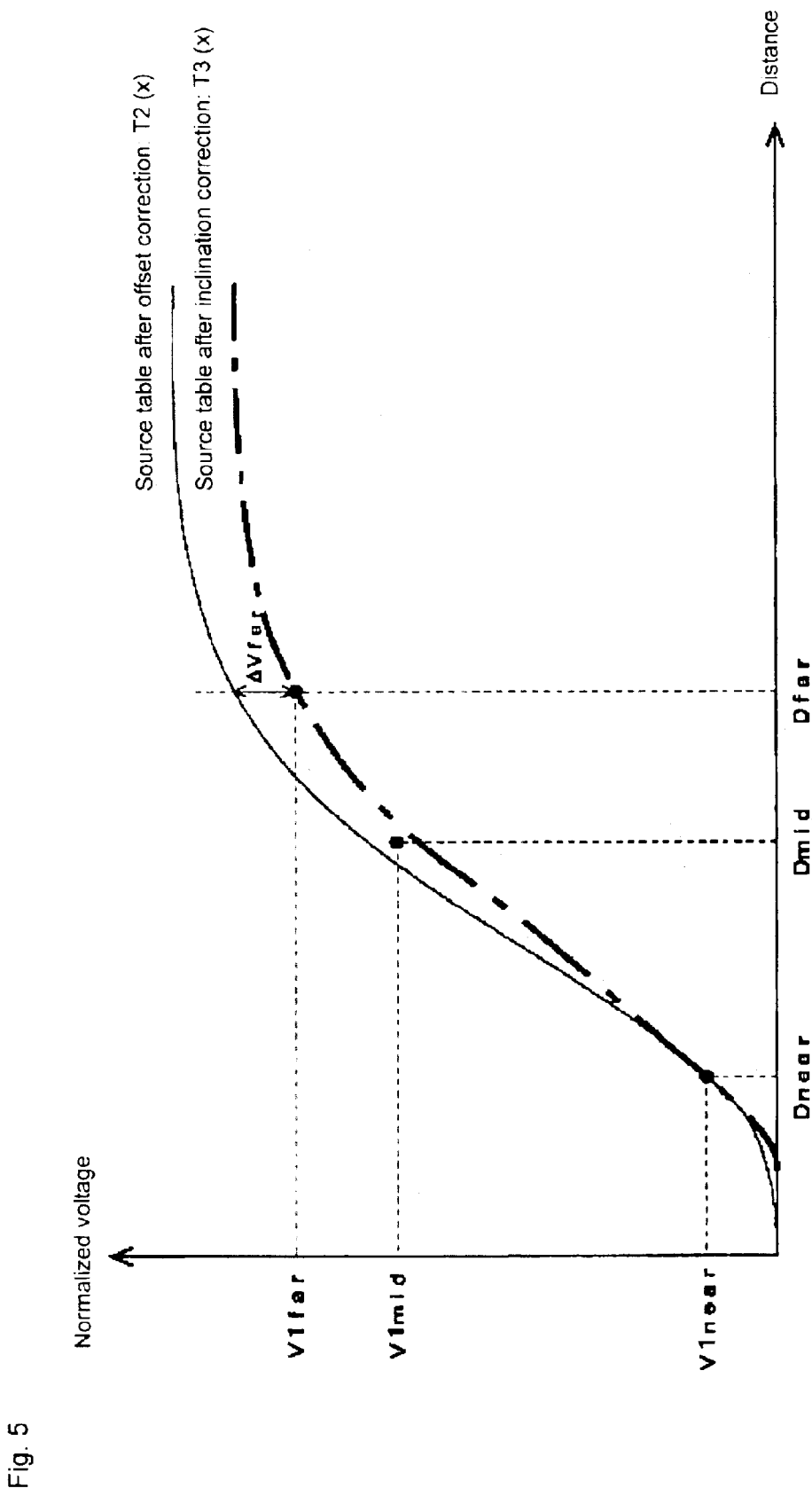
FIG. 5 shows a view of a concrete example of inclination correction.
Figure 6:
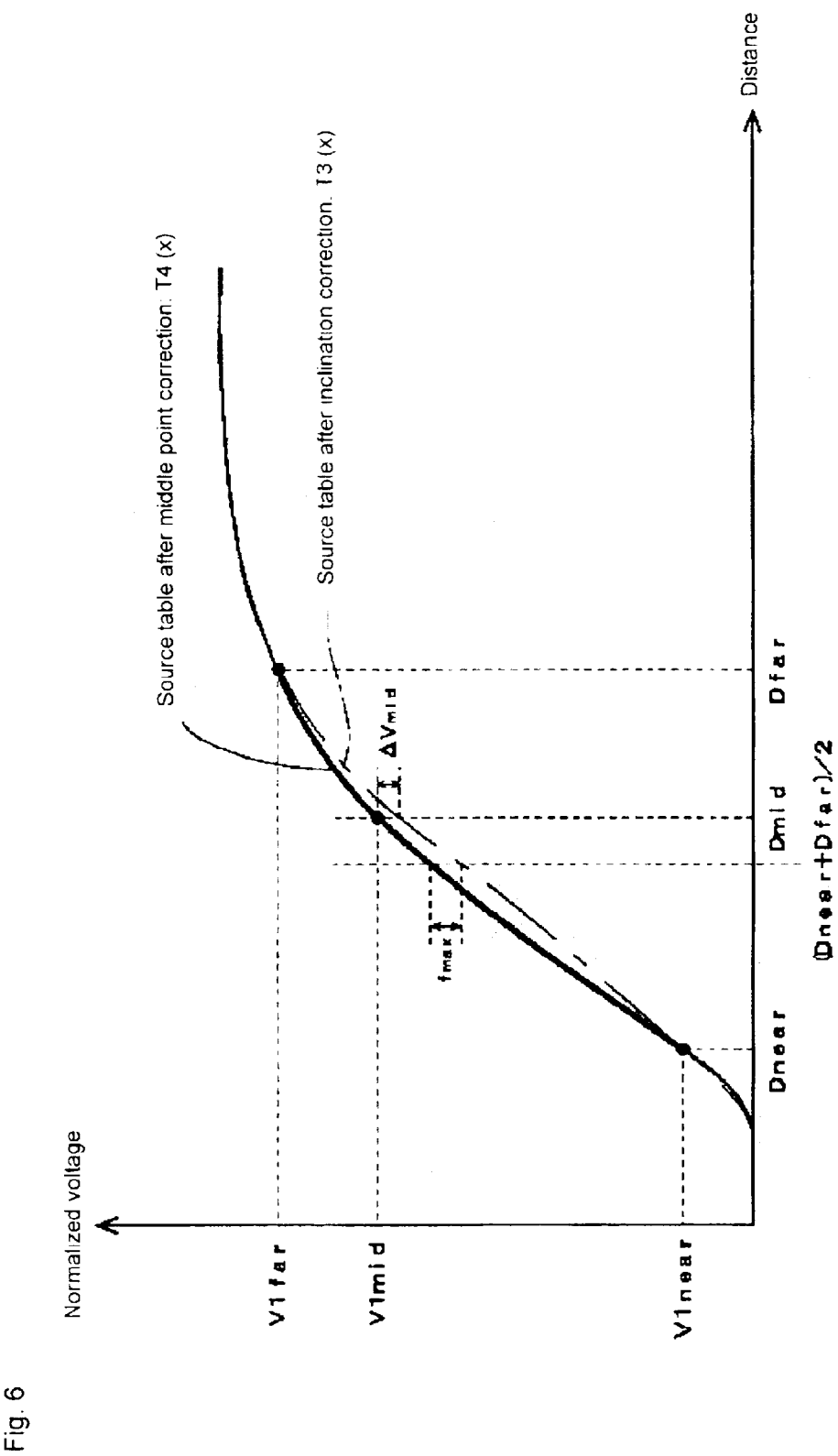
FIG. 6 shows a view of a concrete example of middle point correction.

Then, in the following processing, the range regarding Dnear to Dfar is provided as the usage range after distance is corrected for the following each processing. In addition, tables Ti (x) to T4 (x) shown in FIGS. 4 to 6 are generated in the process of this processing and actually, they are only the voltage within the usage range. However, in the drawing, as a matter of convenience, they are shown as the standard curving line including the voltage around the usage range so as to correspond to the source table T0 (x)

(2) Normalization Processing

When the usage range is extracted from the source table, the actually measured values Vnear, Vmid, Vfar and each voltage included in the usage range of the source table is normalized, in order to match a curvature of the standard curving line corresponding to the usage range, to the measured result in the sensor of this embodiment. According to this embodiment, the actually measured values Vnear, Vmid and Vfar are normalized by the voltage Vfar at the farthest distance Dfar, and each voltage of the source table is normalized by the voltage T0 (Dfar) at the farthest distance Dfar.

Then, correction is sequentially made using the normalized voltages so that the change between voltages extracted from the source table may become suitable for the characteristics of the changes shown by the three actually measured values. In addition, from FIG. 4 on, the voltage axis is the voltage after normalization (shown as normalized voltage in the drawings), and normalized actually measured values V1near, V1mid and V1far are shown corresponding to the distances Vnear, Vmid and Vfar, in addition to each voltage in the source table (hereinafter, the normalized actually measured values V1near, V1mid and V1far are referred to as the actually measured values).

(3) Offset Correction

This correction is made to match the voltage T1 (Dnear) at the shortest distance Dnear to the actually measured value V1near in the source table T1 (x) after the normalization processing. FIG. 4 shows a concrete example of this correction, in which difference operation between the voltage T1 (Dnear) and the actually measured value V1near is performed and obtained difference ΔVnear (which is a negative value in the example) is added to each voltage in the table T1 (x) as an offset value. Thus, the standard curving line of the source table moves in parallel along the voltage axis and set as a source table T2 (x) after the offset processing. According to the source table T2 (x), the voltage T2 (Dnear) at the shortest distance Dnear coincides with the actually measured value V1near.

(4) Inclination Correction

This correction corrects inclination of the standard curving line so that the voltage T2 (Dfar) at the farthest distance Dfar may be matched to the measured value V1far, for the source table T2(x) after the offset correction. In addition, since the voltage T2 (Dnear) at the shortest distance Dnear has been corrected so as to be equal to the actually measured value V1near by the offset correction, this value has to be maintained.

Then, according to the second correction, a correction amount Δt (x) which varies according to the change in distance at a constant rate is set by the following second equation (2). In addition, according to the equation (2), Δfar is a difference between T2 (Dfar) and V1far.

$$\Delta t\ (x) = \{1 - (D\text{far} - x)/(D\text{far} - D\text{near})\} * \Delta V\text{far} \qquad (2)$$

According to the equation (2), the correction amount Δt (x) is 0 when x=Dnear, and as x is increased, it is also increased. Then, it becomes the maximum value ΔVfar when x=Dfar.

FIG. 5 shows a concrete example in which inclination correction is made for the source table T2 (x) after the offset correction. When the correction amount Δt (x) is added to each voltage T2 (x) in the extraction range in the table T2 (x), there is set a source table T3 (x) in which the voltage T1 (Dnear) at the distance Dnear coincides with the actually measured value V1near and the voltage T2 (Dfar) at the distance Dfar coincides with the actually measured value V1far.

(5) Middle Point Correction

Thus, when shifts of the voltages in the shortest distance Dnear and the farthest distance Dfar are corrected, correction is to be made so as to match the voltage at each point between the Dnear and Dfar to the actually measured value (this correction is referred to as middle point correction hereinafter). FIG. 6 shows a concrete example of the middle point correction for the source table T3 (x) after the inclination correction and T4(x) shown by a solid line is a source table after the middle point correction.

According to this correction, an error between a voltage at each distance included in the usage range and the actually measured value is estimated and this error is corrected. Here, since the voltages at the farthest distance Dfar and the shortest distance Dnear have been already matched to the actually measured values, it is assumed that the error is zero there and the error is increased as a distance from the Dnear and Dfar is increased. Thus, a correction amount reflecting the error is found. According to this embodiment, it is assumed that the correction amount becomes the maximum value $f_{max}$ at a center point of the usage range (that is, a point in which a distance is (Dnear+Dfar)/2), and the correction amount is reduced as the distance from this center point is increased and the correction amount becomes 0 at the distance Dnear and Dfar, a function f (x) taking a value corresponding to the cube of the distance from the center point is set to each point x included in the usage range, and the value obtained from the f (x) becomes the correction amount at that point. In addition, in this case, it is preferable that a parameter of the function f (x) is set such that the correction amount f (Dmid) corresponding to the middle distance Dmid may be equal to a difference Δvmid between the voltage T3 (Dmid) after the inclination correction and the actually measured value V1mid.

Referring to FIG. 6, a part shown by a heavy line in the table T4 (x) corresponds to a last result in which the normalization processing and the three-stage corrections are performed to each voltage included in the usage range extracted from the source table T0 (x). The CPU 3 creates a table relating each voltage of the part of this heavy line to each distance and stores it as the conversion table in the memory 4.

Figure 7:
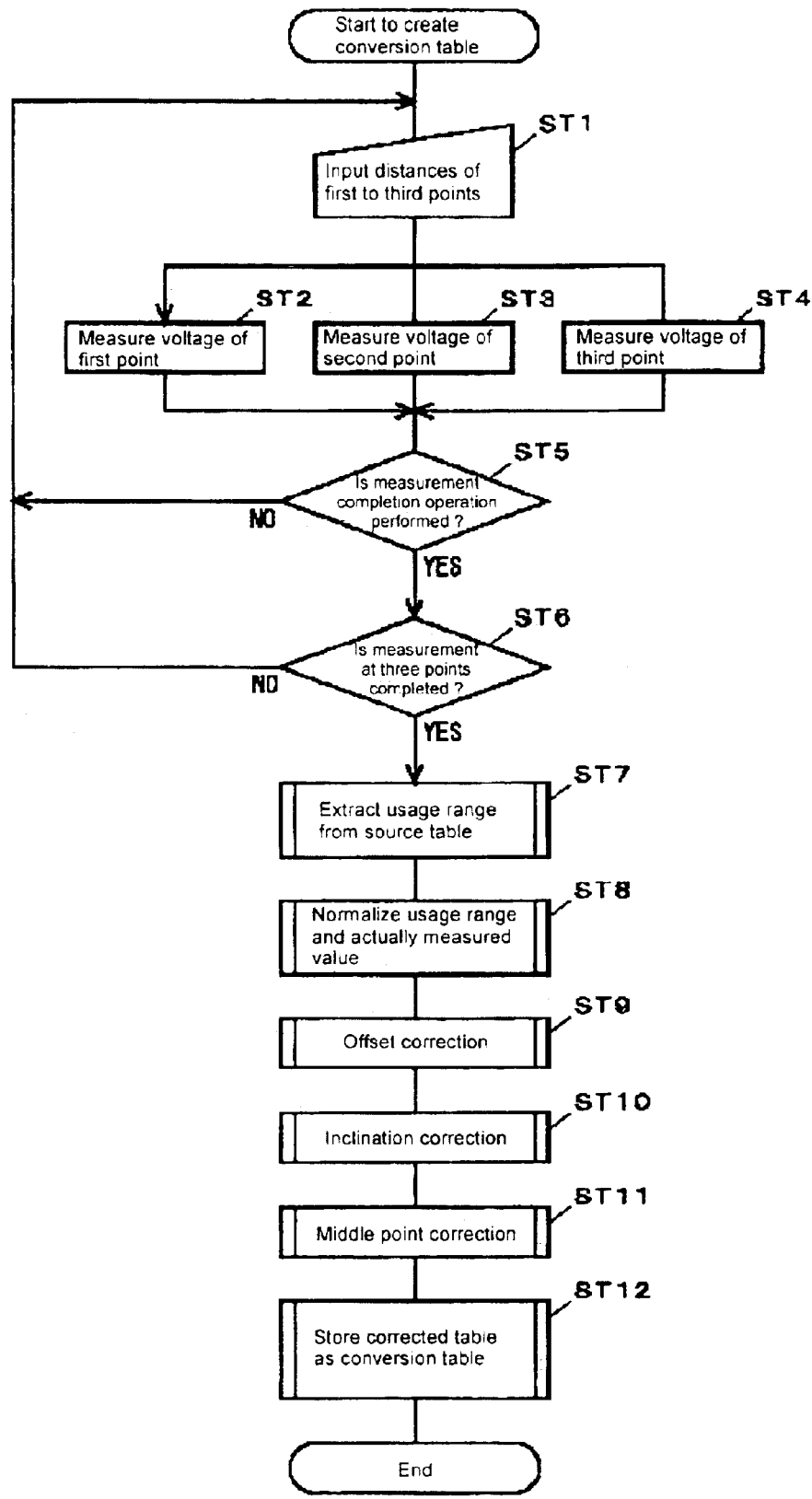
FIG. 7 shows a flowchart of procedures regarding creation of the conversion table.

FIG. 7 shows a series of procedures for creating the conversion table in the above described displacement sensor. In addition, before this operation, the user has to install the sensor in the actual usage environment.

After the sensor is installed, the user arranges the detection object at any point of the three points such as the nearest point from the sensor, the farthest point from the sensor and a random point in the detection range determined by the user and inputs a distance to the measurement point at step ST1. The CPU 3 takes in an input from the A/D conversion circuit 2 while corresponds to the input of the distance, and recognizes this as actually measured values of the amplitude voltages corresponding to the input distances at steps ST2 to ST4.

The distance input and the voltage measurement processing are performed for the three measurement points. In addition, the processing for each measurement point can be performed in a random order. Furthermore, according to this embodiment, at the time of the distance input processing, data for identifying the measurement points such as 1, 2 and 3 in increasing order of distance from the sensor may be input together with the distance. Even when the distance at the measurement point has been input, it can be input again by designating the identification data. Thus, the user can repeat input operation as many times needed while recognizes the position of the measurement point.

When the distance input processing for the three measurement points is completed, the user performs a predetermined measurement completion operation. When "YES" is made by this operation at step ST5, the CPU 3 determines whether the voltage measurement for the three measurement points is completed or not at step ST6. When the voltage measurement processing for the three points is not completed, "NO" is provided at step ST6 and the operation returns to step ST1 in disregard for the measurement completion operation.

When the voltage measurement for the three points is completed, the shortest distance Dnear, the middle distance Dmid, the farthest distance Dfar are set based on the input distance and the identification data and the actually measured values Vnear, Vmid and Vfar corresponding to the distances are recognized from the obtained measured values of the voltages at step ST7. Then, the extraction processing of the usage range corresponding to the source table is performed by applying these values to the equation (1). In addition, processing for correcting the corresponding distance is performed for each voltage included in the extracted usage range based on the shift amount i.

Then, the normalization processing is performed for each voltage included in the extracted usage range and the actually measured values Vnear, Vmid and Vfar at step ST8. Then, the above described offset correction, the inclination correction and the middle point correction are sequentially performed, using each normalized voltage at steps ST9 to ST11. Then, the conversion table relating each voltage in the usage range after the corrections are performed to each distance is created and stored in the memory 4 at the last step ST12.

According to the above procedures, the conversion table is automatically created in the sensor after the user performs the processing for arranging the detection object and the processing for inputting the distance corresponding to the arranged position three times, and it is stored in the memory 4. In other words, if only the user determines the detection range according to the usage condition of oneself and arranges the detection object at the three measurement points in the detection range in any order and input the distances, the conversion table suitable for the detection range can be created.

As described above, according to the displacement sensor of this embodiment, since the conversion table suitable for the detection range set by the user oneself can be created under the condition in which the sensor is set in the actual usage environment, the distance detection processing can be performed with high precision.

In addition, according to this embodiment, since the input processing of the distance to each measurement point and the voltage measurement processing can be performed in any order and also they can be started all over again, operationality can be improved and convenience in the setting processing can be also improved. Furthermore, even after the conversion table is set, when the detection range is converted, or the installation state of the sensor is changed, the setting processing can be performed again to create the conversion table depending on the new usage condition.

Still further, although the three measurement points are provided in order to create the conversion table according to this embodiment, the present invention is not limited to this, and the measurement may be performed at two points corresponding to the shortest distance Dnear and the farthest distance Dfar and at plurality of points included between these two points. In this case, high-precision correction processing can be performed based on the plural actually measured values at the time of middle point correction. Similarly, when the usage range is extracted from the source table, high-precision extraction processing can be performed, using ratios between four or more actually measured values.

According to the present invention, the conversion table suitable for the actual usage environment and usage condition of the sensor can be created, based on the distances at arbitral three measurement points and the actually measured values. Furthermore, unlike the conventional example in which the measurement points are determined based on the fixed distances corresponding to the detection ability of the sensor, since the conversion table can be created after the sensor is installed in the actual usage environment, high-precision measurement processing can be performed while precision of the conversion table is secured.

What is claimed is:

1. A displacement sensor comprising:
a detection coil;
an oscillation circuit for generating a high-frequency magnetic field in the detection coil;
a controller for inputting a signal showing an oscillation state of the oscillation circuit and detecting a distance to a detection object;
a memory for storing a conversion table for detecting the distance; and
an operation portion for inputting distance data for the detection object,
wherein the controller comprises:
actually measured value recognizing means for inputting a signal showing an oscillation state of the oscillation circuit while corresponds to the data input from the operation portion and recognizing a value in the obtained signal as an actually measured value corresponding to the distance in the input data;
correcting means for correcting a source table showing a standard relation between a measured value in the oscillation circuit and a distance to the detection object so as to be matched to a recognition result of the actually measured value recognizing means for arbitral three distances; and
storing means for storing the relation between each measured value after corrected and distance in the memory as the conversion table.

2. A method of creating a conversion table for detecting a distance, used in processing for converting an oscillation state of an oscillation circuit, to a distance to a detection object, in a displacement sensor including a detector in which the oscillation circuit generates an AC magnetic field for detecting the object; comprising
a step of arranging the detection object at each measurement point of any three measurement points whose distance from the displacement sensor is known, in any order and measuring the oscillation state of the oscillation circuit at the measurement point;
a step of extracting a range which corresponds to a distance between the nearest measurement point and the farthest measurement point from the detector, in which a ratio between measured values corresponding to measurement points closely resembles a ratio between the actually measured values at the measurement points, from a source table showing a standard relation between the measured value of the oscillation circuit and a distance to the detection object;
a step of correcting a measured value included in the range extracted from the source table so that the measured value corresponding to the measurement point may be matched to the actually measured value; and
a step of setting a table showing a relation between the measured value after corrected and the distance as the conversion table.

3. A displacement sensor comprising:
a detection coil;
an oscillation circuit for generating a high-frequency magnetic field in the detection coil;
a controller for inputting a signal showing an oscillation state of the oscillation circuit and detecting a distance to a detection object;
a memory for storing a conversion table for detecting the distance; and
an operation portion for inputting data showing a distance to the detection object, wherein the controller comprises:

actually measured value recognizing means for inputting a signal showing an oscillation state of the oscillation circuit while corresponds to the data input from the operation portion and recognizing a value in the obtained signal shows as an actually measured value corresponding to the distance in the input data;

extracting means for extracting a range which corresponds to a difference between the farthest distance and the shortest distance, in which a ratio between measured values corresponding to the three measurement points closely resembles a ratio between the actually measured values, from a source table showing a standard relation between the measured value of the oscillation circuit and a distance to the detection object, based on a recognition result of the actually measured value recognizing means for any three distances;

correcting means for correcting a measured value included in the range extracted by the extracting means so that the measured value corresponding to the distance may be matched to the actually measured value; and storing means for storing the relation between the measured value after corrected and distance in the memory as the conversion table.

4. The displacement sensor according to claim 3, wherein the operation portion is set so as to be able to perform a confirming operation, and the actually measured value recognizing means of the controller comprises modifying means for modifying the recognition result by receiving a retype for the already recognized actually measured value or a distance until the confirming operation is performed.

* * * * *